3,036,138
RUBBER CONTAINING A CONDENSATION PRODUCT OF A PHENOLIC DERIVATIVE WITH DICYCLOPENTADIENE AS AN ANTIOXIDANT
Georges Raymond Henry Mingasson, Paris, and Michel Jean Camille Alicot, Gavignot, Soisy-sous-Montmorency, France, assignors to Compagnie Française des Matieres Colorantes, Paris, France, a company of France
No Drawing. Filed Feb. 2, 1960, Ser. No. 6,091
Claims priority, application France Feb. 2, 1959
10 Claims. (Cl. 260—810)

The present invention relates to novel compositions of matter containing, as anti-oxidants, condensation products of phenolic derivatives with dicyclopentadiene which contain a free phenolic function.

The condensation of phenolic derivatives with cyclopentadiene or with its polymerisation products has already been described. Thus, for example U.S. Patent No. 2,385,787 of October 2, 1945, describes a series of compounds resulting from the combination of phenols and dicyclopentadiene. These compounds no longer possess a free phenol group; they are ethers and they may be employed as insecticides, solvents or plasticisers.

On the other hand, condensations of phenols and cyclopentadiene have been mentioned in French Patent No. 1,084,390 of July 21, 1953, which describes the preparation of cyclopentenyl phenols. These bodies are obtained by condensing phenols with cyclopentadiene or with a compound from which cyclopentadiene is formed, such as dicyclopentadiene or one of its higher homologues. Under the conditions of this method of preparation, dicyclopentadiene or its homologues are depolymerised to cyclopentadiene. The compounds thus obtained have fungicidal, insecticidal and herbicidal properties.

Neither of the above-mentioned patents mentions the use of the products obtained by their respective processes as antioxidants for substances which are liable to deteriorate on ageing.

We have now found that the products resulting from the condensation of phenolic derivatives with dicyclopentadiene which contain a free phenol group are antioxidants of value for substances which are liable to deteriorate on ageing, e.g. organic substances such as natural or synthetic rubber, essential oils, fats, lubricating oils or plasticisers. They have also the advantage of not colouring the substances with which they are incorporated.

According to the present invention therefore a composition of matter is provided comprising a substance liable to deteriorate on ageing and, as an antioxidant, a phenolic derivative capable of being obtained by the condensation of dicyclopentadiene with a phenol the nucleus of which is substituted by members selected from the group consisting of hydrogen and halogen atoms, saturated and unsaturated hydrocarbon groups and alkoxy groups, one at least of the 2-, 4- and 6-positions being substituted by a hydrogen atom under conditions such that the dicyclopentadiene is not depolymerised.

The phenolic derivatives which may be used for the preparation of the condensation products are compounds possessing at least one functional hydroxyl group and in which the benzene nucleus may be substituted in one or more places by saturated or unsaturated hydrocarbon groups, halogen atoms or alkoxy groups, one at least of the 2-, 4- or 6-positions, preferably one of the 2- or 6-positions, being free. For the condensation with dicyclopentadiene, mixtures of such phenols may be used. The relative proportions of the phenol derivative and the dicyclopentadiene may be varied; it is advisable however to use at least one molecule of the former to one molecule of the latter.

The condensation is carried out under conditions such that the dicyclopentadiene does not depolymerise. Such conditions are obtained if, for example, the operation is effected at temperatures below the depolymerisation temperature of dicyclopentadiene. The reaction temperature may be varied from 30° C. to 150° C. and it is not advisable to exceed the latter limit. The process is preferably effected in the presence of a catalyst of the type used in the Friedel-Crafts reaction, such as for example, boron trifluoride or a complex based on boron trifluoride. The reaction may be carried out with or without the use of a solvent. When a solvent is used, it must not be capable of taking part in the reaction.

The products utilisable as antioxidants may also be obtained by isomerisation, in their phenolic form, of the ethers resulting from the condensation of the phenolic derivatives with the dicyclopentadiene, according to a reaction analogous to that of Fries. The process is effected under the conditions of temperature and reaction medium indicated above.

It is thus possible to obtain products in which the phenolic nucleus is effectively substituted by at least one dicyclopentenyl group and of which the simplest form may be represented by the formula:

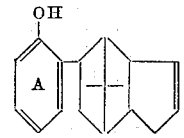

in which the benzene nucleus A may be substituted by saturated or unsaturated hydrocarbon groups, halogen atoms or alkoxy groups. These phenolic compounds are mostly more or less polymerised.

The following examples, in which the parts are expressed as parts by weight unless the contrary is indicated, illustrate the invention without limiting it.

*Example 1*

324 parts of paracresol and 870 parts of dry toluene are introduced into an apparatus provided with a stirrer, a thermometer and a condenser. 19.5 parts of catalyst ($BF_3(CH_3$—$COOH)_2$) are then introduced into the solution obtained. While keeping the temperature between 25° C. and 30° C. 132 parts of dicyclopentadiene are run in dropwise. The temperature is raised to 45° C. and the mixture is stirred for a further 4 hours at this temperature. Then 150 parts of water are added, the mixture is stirred for a quarter of an hour and the toluene layer is poured off, washed until neutral and then dried. The toluene is driven off and the residue distilled; after recovering 198 parts of paracresol, 155 parts of an oil are collected at between 190° C. and 240° C. under 7–8 mms. of Hg which, when refractionated, give at B.P.$_4$: 173–176° C. 74 parts of an oily product which when crystallised from alcohol melts at 56° C. and at B.P.$_4$: 200–205° C., 62 parts of another oily product melting at 76–77° C. after crystallisation from heptane. The part melting at 56° C. consists of the ether (A):

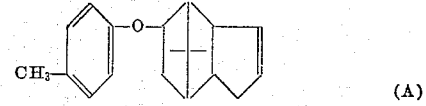

and the part melting at 76–77° C. consists of the new alkylated product (B):

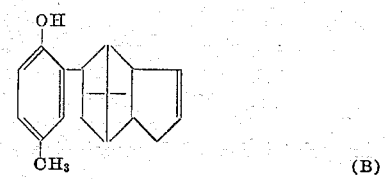

*Analysis.*—Calculated, percent: C, 85.0; H, 8.33; O, 6.66. Found, percent: C, 84.87; H, 8.40; O, 6.68.

The product (B) gives a phenyl urethane: $C_{24}H_{25}O_2N$.

*Analysis.*—Calculated, percent: N, 3.90. Found, percent: N, 3.96.

Example 2

100 parts of the ether (A) obtained in Example 1 are dissolved in 175 parts of dry toluene in an apparatus provided with a stirrer, a thermometer and a condenser. 12 parts of catalyst ($BF_3(CH_3COOH)_2$) are then introduced and the mixture is heated for 4 hours at 40° C. 100 parts of water are then added, the toluene layer is run off, washed until neutral and dried. The toluene is driven off and the residue distilled. In addition to the paracresol and non-isomerised starting ether (A), 20 parts of an oil (B.P.$_5$: 210–220° C.) are recovered which, after crystallisation from heptane, melts at 76–77° C. Its melting point is not lowered by admixture with a specimen of the alkylated product (B) prepared in Example 1.

Example 3

64.8 parts of paracresol and 3.5 parts of catalyst ($BF_3\text{-}(C_2H_5)_2O$) are introduced into the same apparatus as that described in Example 1. 26.2 parts of dicyclopentadiene are then run in dropwise while keeping the temperature below 40° C. The mixture is then heated for 4 hours at 130° C. After cooling, it is stirred with 50 parts of water and the mixture extracted with ether. After drying the ethereal solution, the excess paracresol is distilled off. The condensation product (C) remains which, after solidification, melts at 114–117° C.

Example 4

64.8 parts of metacresol and 3.5 parts of catalyst ($BF_3\text{-}(C_2H_5)_2O$) are introduced into the apparatus described in Example 1. 26.2 parts of dicyclopentadiene are run in dropwise at a temperature below 40° C. The temperature is then raised to 130° C. and maintained at this level for 4 hours. The mixture is allowed to cool to 100° C. and 200 parts by volume of 10% caustic soda are run in while stirring. When the mass has become homogeneous, it is filtered, washed until neutral and dried. 59.7 parts of a condensation product of melting point 111–114° C. are obtained.

Example 5

On following the procedure of Example 4, but using 104.8 parts of paracresol, 63 parts of dicyclopentadiene and 5 parts of catalyst ($BF_3(C_2H_5)_2O$), 90 parts of a condensation product melting at 160–164° C. are obtained.

Example 6

The procedure is according to Example 5, but the metacresol of Example 4 is replaced by the same weight of orthocresol. 43.4 parts of a condensation product of melting point 101–105° C. are obtained.

Example 7

108 parts of an equimolecular mixture of metacresol and paracresol are introduced into the apparatus described in Example 1, and then 5 parts of catalyst $$(BF_3\text{-}(C_2H_5)_2O)$$

Then 44 parts of dicyclopentadiene are run in in half an hour in such a way that the temperature rises progressively from room temperature to 90–95° C. at the finish of the addition. The temperature is then taken to 100° C. and maintained at this for 4 hours. The reaction mixture is run into 200 parts by volume of 15% caustic soda, while stirring. When the mixture has become homogeneous, it is diluted to 1500 parts by volume and heated at 70–80° C. for about two hours. It is allowed to cool, filtered, and the precipitate washed until neutral and dried. 97 parts of a condensation product (D) of melting point 115–118° C. are obtained.

Example 8

The process of Example 7 is followed, but 108 parts of a commercial 60/40 mixture of the metacresol and paracresol, 44 parts of dicyclopentadiene and 6.5 parts of catalyst ($BF_3$-paracresol) are used. 92 parts of a condensation product (E) of melting point 122–125° C. are obtained.

Example 9

The process of Example 8 is carried out, but at a temperature of 60° C. 95 parts of a condensation product (F) of melting point 113–115° C. are obtained.

Example 10

The process of Example 7 is followed, but 122 parts of 2,4-dimethylphenol, 44 parts of dicyclopentadiene and 6.5 parts of catalyst ($BF_3(CH_3COOH)_2$) are used. The condensation is carried out at 130° C. for 4 hours. 120 parts of a condensation product (G) of melting point 97–101° C. are obtained.

Example 11

The procedure of Example 7 is followed, but 128 parts of parachlorophenol, 44 parts of dicyclopentadiene and 5 parts of catalyst ($BF_3\text{-}(C_2H_5)_2O$) are used. 87 parts of a condensation product (H) of melting point 148–152° C. are obtained.

The following examples show the antioxidant power of the products described above.

I. The following mixtures are prepared:

|  | I | II | III |
|---|---|---|---|
| Smoked sheets of natural rubber | 100 | 100 | 100 |
| Stearic acid | 1 | 1 | 1 |
| Zinc oxide | 5 | 5 | 5 |
| Sulphur | 3 | 3 | 3 |
| Mercaptobenzothiazole | 1 | 1 | 1 |
| Product C of Example 3 |  | 1 |  |
| Phenyl β-naphthylamine |  |  | 1 |

Vulcanisation is effected at 143° C., for 20 minutes and ageing in an oven at 70° C.

Before ageing:

|  | Resistance to breaking, Kg./cm.² | Amount of stretching at breaking point, percent |
|---|---|---|
| I | 155 | 825 |
| II | 160 | 830 |
| III | 160 | 850 |

After 28 days:

|  | Resistance to breaking, Kg./cm.² | Amount of stretching at breaking point, percent |
|---|---|---|
| I | 70 | 440 |
| II | 159 | 640 |
| III | 155 | 640 |

II. The following mixtures are prepared:

|  | III | IV | V | VI | VII | VIII | IX |
|---|---|---|---|---|---|---|---|
| Smoked sheets of natural rubber | 100 | 100 | 100 | 100 | 100 | 100 | 100 |
| Stearic acid | 1 | 1 | 1 | 1 | 1 | 1 | 1 |
| Zinc oxide | 5 | 5 | 5 | 5 | 5 | 5 | 5 |
| Sulphur | 3 | 3 | 3 | 3 | 3 | 3 | 3 |
| Diphenylguanidine | 1 | 1 | 1 | 1 | 1 | 1 | 1 |
| Product D of Example 7 |  | 1 |  |  |  |  |  |
| Product E of Example 8 |  |  | 1 |  |  |  |  |
| Product F of Example 9 |  |  |  | 1 |  |  |  |
| Product G of Example 10 |  |  |  |  | 1 |  |  |
| Product H of Example 11 |  |  |  |  |  | 1 |  |
| Antioxidant 2246 of commerce |  |  |  |  |  |  | 1 |

Vulcanisation is effected at 143° C. for 40 minutes and ageing in an oven at 70° C.

Before ageing:

|  | Resistance to breaking, Kg./cm.² | Stretching at breaking point, percent |
|---|---|---|
| III | 196 | 790 |
| IV | 202 | 820 |
| V | 210 | 815 |
| VI | 200 | 850 |
| VII | 205 | 845 |
| VIII | 196 | 840 |
| IX | 198 | 845 |

After 21 days:

|  | Resistance to breaking, Kg./cm.² | Amount of stretching at breaking point, percent |
|---|---|---|
| III | 17 | 305 |
| IV | 112 | 700 |
| V | 151 | 725 |
| VI | 135 | 710 |
| VII | 129 | 680 |
| VIII | 91 | 675 |
| IX | 146 | 680 |

We claim:

1. A composition of matter consisting essentially of rubber and, as an antioxidant, a phenolic derivative obtained by the condensation of one molecule of dicyclopentadiene with at least one molecule of a phenol the nucleus of which is substituted by members selected from the group consisting of hydrogen and halogen atoms, saturated and unsaturated hydrocarbon groups and alkoxy groups, one at least of the 2-, 4-, and 6-positions being occupied by a hydrogen atom under conditions such that the dicyclopentadiene is not depolymerised.

2. A composition of matter as defined in claim 1 in which one at least of the 2- and 6-positions of the nucleus of the phenol are occupied by a hydrogen atom.

3. A composition of matter as defined in claim 1 in which the phenol and the dicyclopentadiene are condensed in the presence of a Friedel-Crafts type catalyst.

4. A composition of matter as defined in claim 1 in which the phenol and the dicyclopentadiene are condensed at a temperature below the depolymerisation temperature of the dicyclopentadiene.

5. A composition of matter as defined in claim 1 in which the phenol is a member selected from the group consisting of ortho-, meta- and para-cresol, 2:4-dimethylphenol, parachlorophenol and mixtures thereof.

6. A composition of matter as defined in claim 3 in which the catalyst is a member selected from the group consisting of boron trifluoride and complexes based on boron trifluoride.

7. A compostion as defined in claim 5 in which the temperature is from 30° C. to 150° C.

8. A composition of matter consisting essentially of rubber and, as an antioxidant, a phenolic derivative obtained by the condensation of dicyclopentadiene with a phenol the nucleus of which is substituted by members selected from the group consisting of hydrogen and halogen atoms, saturated and unsaturated hydrocarbon groups and alkoxy groups, one at least of the 2-, 4- and 6-positions being occupied by a hydrogen atom, the condensation being carried out in the presence of a catalyst selected from the group consisting of boron trifluoride and complexes based on boron trifluoride at temperatures between 30° C. and 150° C., using at least one molecule of phenol to one molecule of dicyclopentadiene.

9. A composition of matter consisting essentially of rubber and, as an antioxidant, a phenolic derivative obtained by isomerisation, in the presence of a catalyst selected from the group consisting of boron fluoride and complexes based thereon of the ethers resulting from the condensation of one molecule of dicyclopentadiene with at least one molecule of a phenol substituted by members selected from the group consisting of hydrogen and halogen atoms, saturated and unsaturated hydrocarbon groups and alkoxy groups, one at least of the 2-, 4-, and 6-positions being occupied by a hydrogen atom.

10. The method of preventing rubber from deteriorating on aging consisting essentially of adding to said rubber an anti-oxidant amount of a phenolic derivative obtained by condensation of one molecule of dicyclopentadiene with at least one molecule of a phenol the nucleus of which is substituted by members selected from the group consisting of hydrogen and halogen atoms, saturated and unsaturated hydrocarbon groups and alkoxy groups, one at least of the 2-, 4- and 6-positions being occupied by a hydrogen atom, under conditions such that the dicyclopentadiene is not depolymerised.

References Cited in the file of this patent

UNITED STATES PATENTS

| 2,385,787 | Bruson | Oct. 2, 1945 |
| 2,871,136 | Eckhardt et al. | Jan. 27, 1959 |

OTHER REFERENCES

Morawetz: "Phenolic Antioxidants for Paraffinic Materials," Ind. and Eng. Chem., vol. 41, No. 7, pp. 1442–7, July 1949.